Aug. 9, 1932.  J. F. WENTZ  1,871,351
ENTRANCE DIE FOR TANKS
Filed Sept. 22, 1930
FIG. 1.
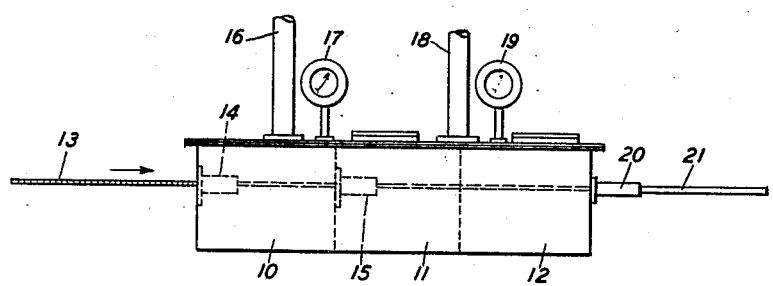
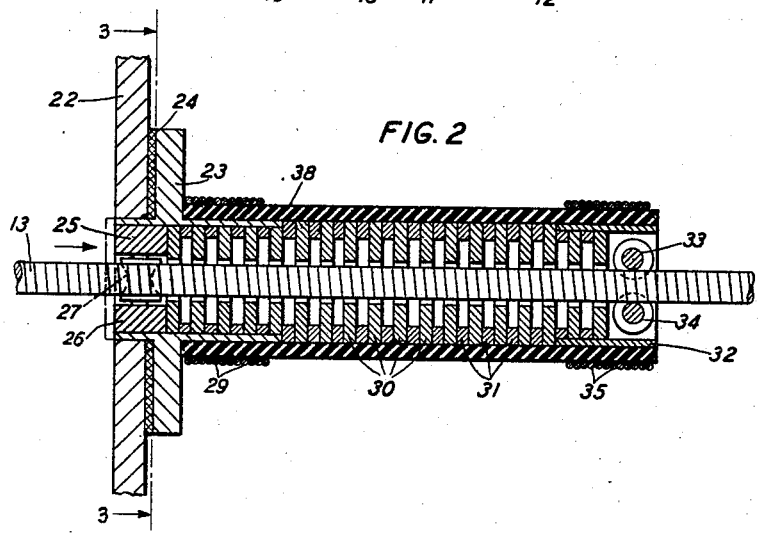
FIG. 2
FIG. 3
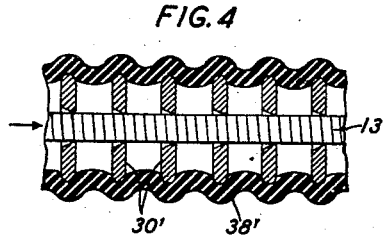
FIG. 4
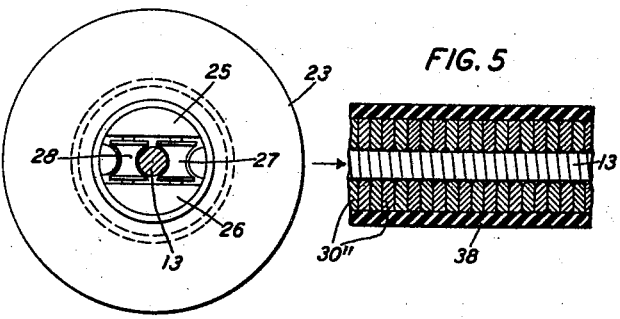
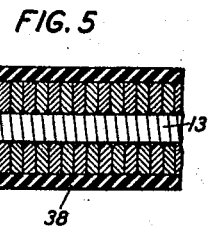
FIG. 5
INVENTOR
J. F. WENTZ
BY
J. W. Schmied
ATTORNEY Patented Aug. 9, 1932

1,871,351

UNITED STATES PATENT OFFICE

JESSE F. WENTZ, OF NEW YORK, N. Y., ASSIGNOR TO BELL TELEPHONE LABORATORIES, INCORPORATED, OF NEW YORK, N. Y., A CORPORATION OF NEW YORK

ENTRANCE DIE FOR TANKS

Application filed September 22, 1930, Serial No. 483,602, and in Great Britain September 23, 1929.

This invention relates to entrance dies for passing strands into vacuum or pressure tanks for gases or fluids and is particularly applicable, though not restricted, to entrance dies or sealing glands for vacuum impregnating tanks for electric cables such as submarine cables.

In the manufacture of submarine cables it is customary to subject the conductor having spirally applied tape or wire loading material to an impregnating process and a process of applying the insulation proper. In carrying out these processes the loaded conductor is run through a die into the vacuum chamber in which, for satisfactory results, a good vacuum must be maintained. After passing through the vacuum chamber the conductor is thoroughly impregnated and coated with a viscous pressure equalizing material and the heavy insulating sheath is then applied to the coated conductor.

The provision of an entrance die suitable for maintaining a good vacuum, especially when the tape is applied rather loosely to the conductor, has offered a problem. A rubber die has heretofore been used.

According to the present invention a sealing gland through which a cable may pass to or from a vacuum impregnating tank comprises a tube having a plurality of constrictions distributed along its length. The tube is preferably flexible and may consist, for example, of rubber with or without reinforcement of fabric or the like. The constrictions may be formed by metallic washers supported within the tube. The washers may be spaced apart by rubber or other separators or they may be supported in annular grooves formed in the wall of the tube. The inner edges of the washers may be rounded or chamfered so that they will not injure the conductor or any magnetic loading material or other material applied to it. In certain cases the washers, instead of being spaced apart, may abut against one another. Since the washers, being mounted in a tube which is preferably flexible, are free to have a certain amount of relative movement, they are capable of accommodating the bends in the cable and do not easily cause injury thereto. The holes in the washers may be made of such a diameter as to fit the cable snugly.

For a better understanding of the invention some examples thereof are hereinafter described with reference to the accompanying drawing in which Fig. 1 is a diagrammatical illustration of a series of vacuum impregnating tanks for impregnating a cable, and Fig. 2 is a longitudinal vertical section through a sealing gland constructed in accordance with the invention, Fig. 3 is an end view of the sealing gland taken on line 3—3 in Fig. 2 and Figs. 4 and 5 are partial cross-sectional views corresponding to Fig. 2 and showing alternative constructions of the gland.

Referring now to Fig. 1, three adjacent impregnating tanks 10, 11 and 12 are traversed in succession by the cable 13. At the point at which the cable 13 enters the tank 10 a sealing gland 14 is mounted upon the wall of the tank. At the point at which the cable 13 passes from the tank 10 to the tank 11 another sealing gland 15 is mounted upon the dividing wall between the two tanks.

The tank 10 is exhausted through a vacuum pipe line 16 and is provided with a vacuum gauge 17 to indicate the pressure therein. The tanks 11 and 12 are both exhausted through the vacuum line 18 and a vacuum gauge 19 is provided to indicate the pressure in these two tanks. At the point where the cable 13 leaves the tank 12 a nipple 20 is provided. This nipple 20 may be connected to a tube 21 which is in connection with an extrusion press of the usual type functioning to extrude thermoplastic insulation upon the conductor. The extrusion press and the material in it may be such as to form an effective vacuum seal, in which case the nipple 20 may be of any convenient form. If, however, the cable emerges from the tank 12 into the open air or into some device incapable of maintaining a vacuum the nipple 20 may also be a sealing gland constructed in accordance with the invention. One or more of the tanks may contain impregnating material to be applied to the cable 13.

The sealing glands 14 and 15 and, in certain cases also, the nipple 20, are constructed substantially as illustrated in Figs. 2 and 3.

Referring to Figs. 2 and 3, affixed to the end plate 22 of the tank is a flanged tube 23. The joint between the flange of the flanged tube 23 and the end plate 22 is sealed by a gasket or packing 24. Two cheeks 25 and 26 are mounted within the opening of the flanged tube 23 and support between them waisted or curved rollers 27 and 28. The curved rollers 27 and 28 are such that they snugly embrace and guide the cable 13.

A rubber tube 38 of substantial thickness and preferably reinforced by canvas or other fabric is slipped over the end of the flanged tube 23 and is firmly secured thereto by a wire seizing 29. A plurality of metal washers 30, preferably of steel, are arranged within the tube 38 and are separated from one another by other washers 31 of greater internal diameter consisting of either metal or rubber. The internal diameter of the washers 30 is slightly greater than the overall diameter of the cable, although in the drawings it is shown considerably greater for the sake of clearness. The internal edges of the washers 30, shown square in Fig. 2, are preferably rounded as shown in Fig. 5 or chamfered as shown in Fig. 4.

In the free end of the tube 28 is inserted a rigid metal tube 32 in which are mounted a pair of guide rollers 33 and 34 similar to the guide rollers 27 and 28. The tube 32 is held securely in the end of the tube 28 by means of wire seizing 35. The flanged tube 23 and tube 32 are also filled up with alternate washers similar to but slightly smaller in external diameter than the washers 30 and 31.

The number of washers 30 used may vary from quite a small number such as five up to twenty or even a considerably larger number.

It is found that with the arrangement described a great pressure difference can be maintained between the two ends of the sealing gland with surprisingly little leakage. It appears as if the total pressure difference were distributed over a number of separate seals each formed by one of the washers, 30, and that there is a fairly definite pressure drop at each one of these separate seals. Furthermore, owing to the flexibility of the arrangement the risk of injury to the cable, for example, by displacement of loading material laid thereon, is minimized.

In Fig. 4 is shown an arrangement whereby the washers 30' are held in spaced relation by means of grooves in the flexible tube 38', and in Fig. 5 the washers 30" are shown abutting one another, whereby a greater number of seals may be provided for a given total length of the gland still permitting relative lateral movement of the individual washers.

It will be appreciated that only a few embodiments of the invention have been illustrated by way of example, and that many modifications may be made without departing from the scope of the invention.

What is claimed is:

1. A sealing gland for the passage of a strand through a wall having a higher pressure on one side than on the other, comprising a tube having a plurality of rigid constricting members distributed along its length, said tube being of flexible material to permit said constrictions to move individually.

2. An entrance die for passage of a continuous stranded element such as a loaded conductor into a chamber having an inside pressure different from the outside pressure, comprising a flexible and substantially airtight tube such as a rubber hose, a plurality of rigid washers inserted in said tube with a substantially air-tight fit, the inner edge of said washers conforming closely to the circumference of said element without interfering with its passage.

3. An entrance die to a chamber for passage of a continuous stranded element from a pressure outside said chamber to a different pressure inside said chamber, comprising a tubular member having a series of internal ridges conforming to the surface of said element and forming in conjunction with said element a series of annular air spaces providing alternately free and restricted passages for air or the like, said tubular member being flexible to permit automatic adjustment of said ridges to irregularities in said element without serious disturbance to said restricted passages and said ridges being of rigid material to remain substantially unflexed by the difference in said pressures.

4. In a sealing gland, a flexible enclosing wall, a plurality of metallic separating walls forming an integral flexible unit with said enclosing wall, and a plurality of separators between said operating walls.

5. In a sealing gland, a laterally flexible enclosing wall having a plurality of spacing grooves, and a plurality of rigid washers forming separating walls held in spaced relation by said grooves and forming with said enclosing wall an integral laterally flexible and axially rigid unit.

6. In a sealing gland for passage of a continuous strand, an outer flexible enclosing wall, an inner sealing wall subdivided into a plurality of individually movable rigid sections substantially filling the space between said strand and said enclosing wall.

7. A sealing gland for passage of a continuous strand from a pressure on one side of said gland to a different pressure on the other side thereof which comprises a tubular member, one end of which has freedom of substantial lateral movement with respect to the other end to allow for irregularities in said strand and a plurality of vanes snugly surrounding said strand and mounted within said tube to form a plurality of rigid seals between said tube and said strand substantially unaffected by the difference between said pressures.

8. A multiple sealing gland for passage of a continuously moving strand comprising a tubular outer wall, and a series of disc shaped seals within said wall, each having an aperture snugly conforming to said strand, said outer wall being of flexible material to permit lateral and individual adjustment of said seals to irregularities in said strand, and said seals being of rigid construction to remain unflexed axially of said strand under an applied pressure difference thereby maintaining their sealing action and eliminating interference with the movement of said strand.

In witness whereof, I hereunto subscribe my name this 11th day of September, 1930.

JESSE F. WENTZ.